United States Patent [19]
Johnston et al.

[11] Patent Number: 5,808,231
[45] Date of Patent: Sep. 15, 1998

[54] SOLID PROPELLANT COMBUSTION APPARATUS

[75] Inventors: Ian M. Johnston, Worcester; Raymond C. Gill, Buckinghamshire, both of England

[73] Assignee: Royal Ordnance Plc, Lancashire, England

[21] Appl. No.: 41,703

[22] Filed: Mar. 19, 1993

[30] Foreign Application Priority Data

Mar. 26, 1992 [GB] United Kingdom ................. 9206616

[51] Int. Cl.$^6$ .............................. C06D 5/06; F02K 5/02
[52] U.S. Cl. .............................. 102/291; 60/248; 60/254
[58] Field of Search .................... 60/254, 248, 247; 102/291

[56] References Cited

U.S. PATENT DOCUMENTS

| | | | |
|---|---|---|---|
| 3,065,597 | 11/1962 | Adamson et al. | 60/254 X |
| 3,173,252 | 3/1965 | Ziegenhagen | 60/254 X |
| 3,293,855 | 12/1966 | Cuttill et al. | 60/254 X |
| 4,023,355 | 5/1977 | McDonald | 60/254 X |
| 4,075,832 | 2/1978 | Diesinger et al. | 60/254 X |
| 4,840,024 | 6/1989 | McDonald | 60/253 X |
| 5,133,183 | 7/1992 | Assoka et al. | 60/252 X |

FOREIGN PATENT DOCUMENTS

| | | | |
|---|---|---|---|
| 2230457 | 1/1974 | Germany | 60/254 |
| 107255 | 5/1987 | Japan | 60/254 |
| 1147659 | 4/1969 | United Kingdom . | |
| 1368838 | 10/1974 | United Kingdom | 60/254 |

OTHER PUBLICATIONS

United Kingdom Search Report.

*Primary Examiner*—Peter A. Nelson
*Attorney, Agent, or Firm*—Nixon & Vanderhye P.C.

[57] ABSTRACT

Solid propellant combustion apparatus such as a rocket motor, incorporating a combustion termination valve for providing two combustion phases from a single propellant charge system, the valve comprising a valve body (50) surrounding an opening (52) in the pressure vessel of the combustion apparatus, a valve member (60), retaining means (65) for releasably retaining said valve member in sealing engagement with the valve body whereby to hold the valve closed during a first combustion phase, valve opening means (68) operable on command for releasing said retaining means whereby to cause the valve member (61) to disengage from the valve body thereby opening the valve to terminate said first combustion phase by rapid de-pressurisation of the combustion gases through said opening, and valve closure means (72) operable on command to move the valve member (61) into sealing engagement with the valve body whereby to close the valve prior to re-ignition of the propellant charge for a second combustion phase.

10 Claims, 5 Drawing Sheets

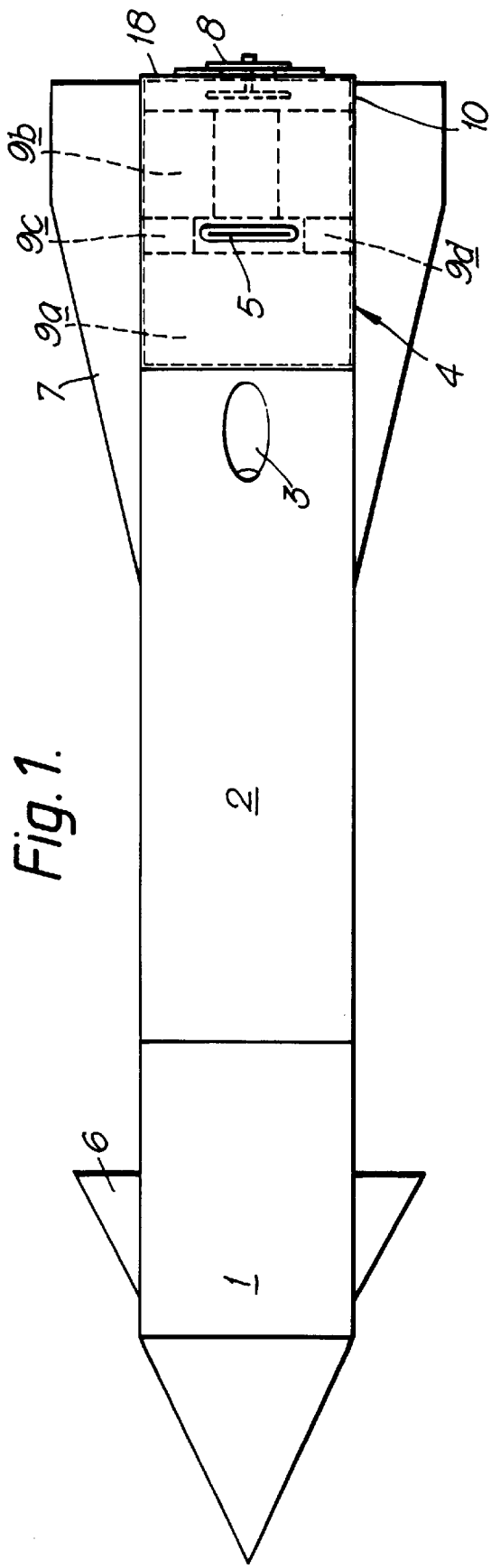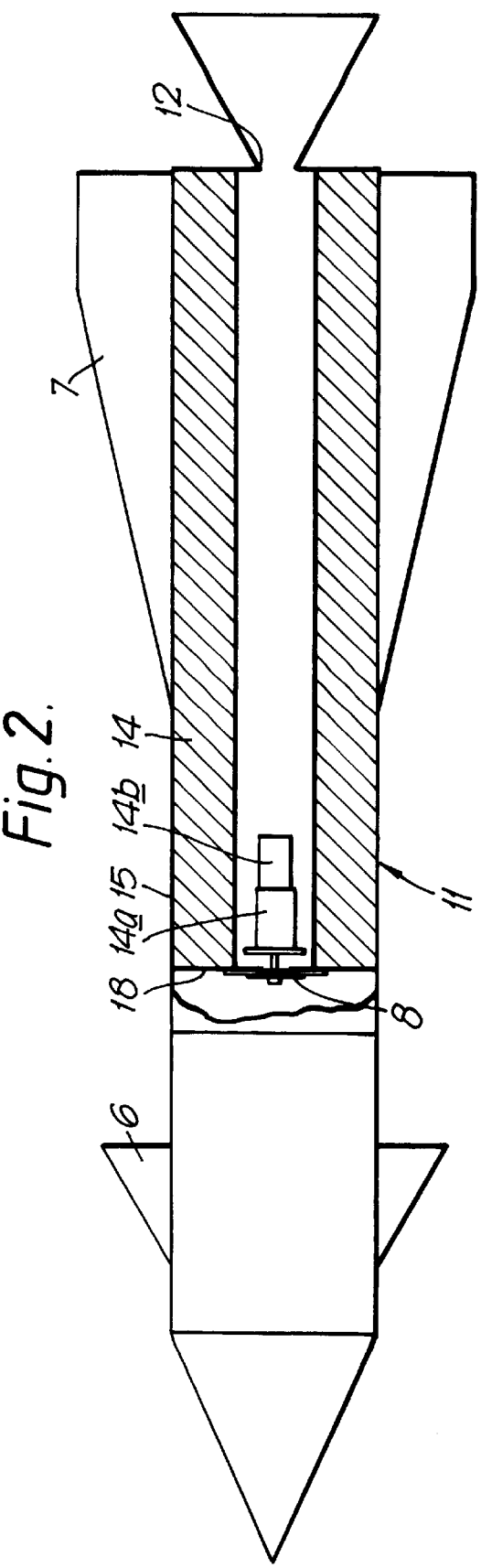

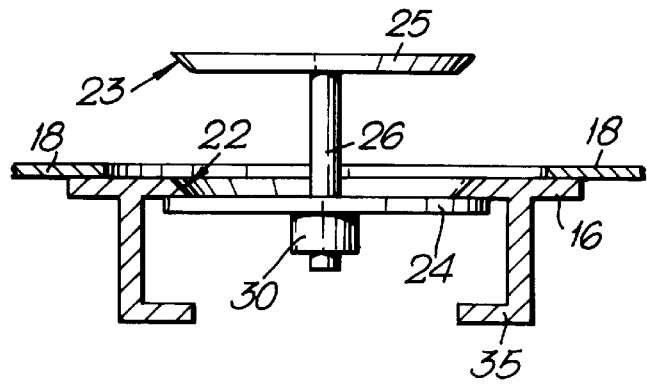
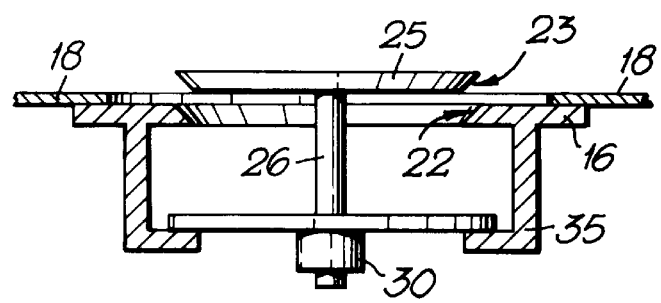
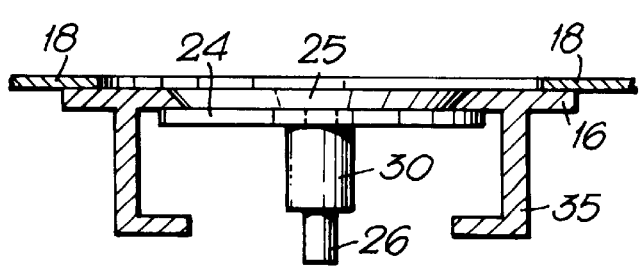
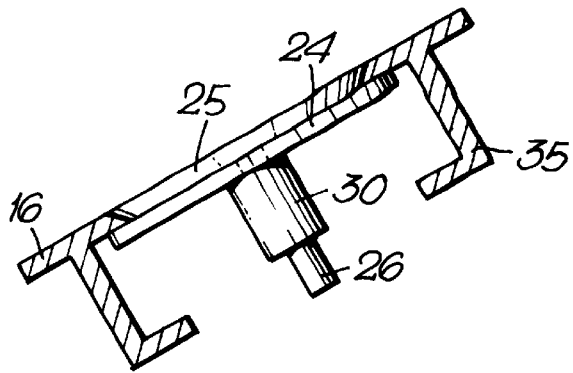

SOLID PROPELLANT COMBUSTION APPARATUS

BACKGROUND OF THE INVENTION

1. Field of the Invention

This invention relates to solid propellant combustion apparatus and valves therefor.

2. Discussion of Prior Art

It is known that combustion of the propellant in a solid propellant combustion apparatus, such as a rocket motor may be terminated by rapid depressurisation of the pressure vessel in which such combustion takes place. This can in turn be used to selectively control the duration of thrust of the rocket motor by appropriate timing of such depressurisation which is typically effected by explosive ejection of a plug sealing an opening in the wall of the pressure vessel.

For certain applications however, it is desirable to provide a missile with two boost stages and hitherto this has necessitated providing two separate rocket motors each separately ignitable when the appropriate thrust is required. The duration and magnitude of the thrust in each boost stage, i.e. the thrust profile, is normally predetermined by the type, size and configuration of the solid propellant charge used in each boost stage as is well known in the art.

SUMMARY OF THE INVENTION

It is an object of the present invention to provide a solid propellant combustion apparatus which is capable of providing two combustion phases from a single propellant charge system.

According to the present invention, a solid propellant combustion apparatus comprises a pressure vessel, a solid propellant charge within the pressure vessel for generating propulsion gases during combustion, and a combustion termination valve located in an opening between the interior and exterior of the pressure vessel, the valve being operable on command to terminate a first combustion phase of the propellant charge by causing rapid depressurisation of the interior of the pressure vessel through the release of combustion gases through said opening, and operable on further command to reseal said opening prior to re-ignition of the propellant charge to provide a second combustion phase.

Preferably the combustion termination valve is also operable on command to cause rapid depressurisation of the interior of the pressure vessel during the second combustion phase thus enabling the rocket motor to provide first and second propulsion thrusts each of variable duration.

In order to effect such termination of the second combustion phase, the combustion termination valve may be releasably retained in said opening by release means which are operable on command to release the valve from said opening to thereby cause rapid depressurisation of the interior of the pressure vessel during the second combustion phase.

According to a first embodiment the combustion termination valve comprises a valve body surrounding said opening, and first and second valve members located on the low pressure side and the high pressure side of said opening respectively, the valve including means for releasably retaining said first valve member in sealing engagement with the valve body whereby to hold the valve closed from the low pressure side thereof during the first combustion phase, valve opening means operable on command for releasing said retaining means whereby to cause the first valve member to disengage from the valve body thereby opening the valve to terminate said first combustion phase by rapid de-pressurisation of the combustion gases through said opening, and valve closure means operable on command to cause the second valve member to sealingly engage the valve body from the high pressure side whereby to close the valve and prior to re-ignition of the propellant charge for the second combustion phase.

Arrangement of the first valve member on the low pressure side of the opening has the advantage that opening of the valve upon actuation of the valve opening means is assisted by the high pressure gas within the pressure vessel. Furthermore, location of the second valve member on the high pressure side of said opening, i.e. within the pressure vessel, ensures that this valve member is not subject to damaging condensation because it is within a high temperature environment where it can also be isolated from the corrosive effects of combustion gases escaping through said opening upon termination of the first combustion phase.

Preferably the valve closure means operates by causing the first and second valve members simultaneously to engage the valve body on opposite sides thereof and this may be achieved by mounting the first and second valve bodies on a common shaft such that they are driven towards one another axially with respect to said shaft upon operation of said valve closing means whereby to positively clamp the valve body between the two valve members. In this way a more effective seal may be achieved.

According to a second embodiment, the thrust termination valve comprises a valve body surrounding said opening, a valve member, retaining means for releaseably retaining said valve member in sealing engagement with the valve body whereby to hold the valve closed during the first combustion phase, valve opening means operable on command for releasing said retaining means whereby to permit the valve member to disengage from the valve body thereby opening the valve to allow rapid depressurisation of the interior of the pressure vessel through said opening, and valve closing means operable on subsequent command to cause the valve member to sealingly engage the valve body whereby to close the valve prior to re-ignition of the propellant charge for the second combustion phase.

BRIEF DESCRIPTION OF THE DRAWINGS

Embodiments of the invention will now be described with reference to the accompanying drawings, in which:

FIG. 1 shows a schematic side elevation of a missile system embodying a solid propellant rocket motor in accordance with the present invention configured to provide lateral thrust pulses of variable duration for maneuvering the missile in flight:

FIG. 2 shows a part-sectional schematic side elevation of a missile system embodying a rocket motor in accordance with the present invention configured to provide the main propulsion thrust for the missile in two propulsion stages, each of variable duration;

FIGS. 5 to 8 illustrate schematic sectional side views of the valve in various stages during its operation.

DETAILED DESCRIPTION OF PREFERRED EMBODIMENTS

Figure 3:
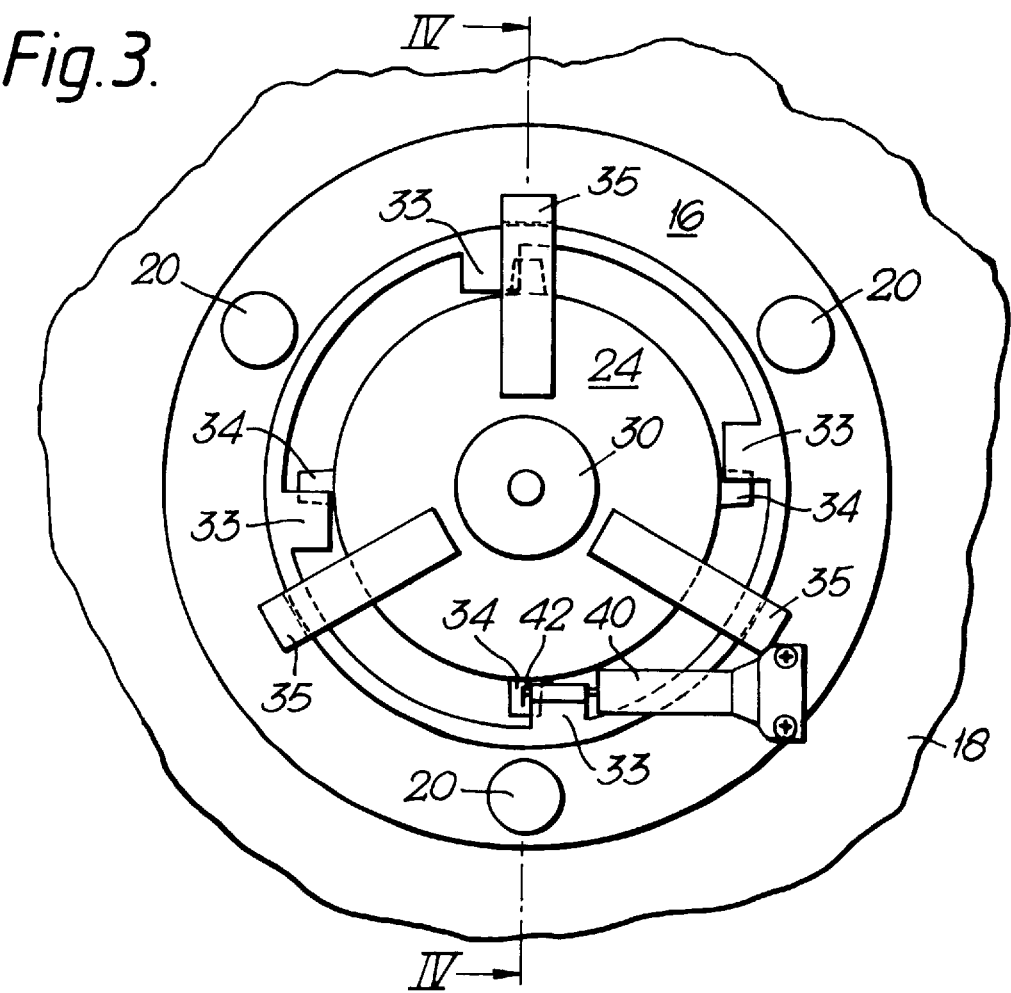
FIG. 3 shows a schematic plan view of a thrust termination valve for a rocket motor in accordance with the present invention, viewed from the exterior of the rocket motor.

Referring now to the drawings, FIGS. 1 and 2 illustrate two applications of the present invention in different configurations of missile systems in which corresponding components bear the same reference numerals. In FIG. 1, the missile comprises a warhead and guidance section 1, a first solid propellant rocket motor 2 providing the main propulsion thrust for the missile system via a plurality of scarfed side-venting nozzles 3, and a second smaller solid propellant rocket motor 4 in accordance with the invention which is formed with side-venting nozzles 5, for providing lateral thrust in order to undertake high turn rate manoeuvres which cannot readily be achieved by means of fins 6 or 7. The rocket motor 4 comprises a cylindrical pressure vessel 10 incorporating a solid propellant charge system comprising a first cylindrical charge 9a and a second annular charge 9b whose central passage permits pressurised combustion gases to escape in operation when a combustion termination valve 8 is opened. The two charges 9a, 9b are axially separated in order to provide a passage through which propulsion gases can vent through the side venting nozzles 5, and in which two igniters 9c and 9d are provided, one for initiating each of the combustion phases of the rocket motor. In this configuration, the combustion termination valve 8 is located in the rear end wall 18 of the pressure vessel 10. The construction and operation of the valve 8 will be described in more detail below.

In FIG. 2, the missile system comprises a warhead and guidance section 1, and a main propulsion solid propellant rocket motor 11 providing thrust through a propulsion nozzle 12 in its rear end wall. The rocket motor 11 comprises a cylindrical pressure vessel 15 incorporating a hollow cylindrical propellant charge 14 which provides a central passage through which combustion gases can vent through the propulsion nozzle 12. The rocket motor 11 incorporates in accordance with the present invention a combustion termination valve 8 for providing the rocket motor 11 with a capability of producing two variable duration thrust phases, and in this configuration, the valve 8 is located in the forward end wall 18 of the rocket motor pressure vessel 15. Directional control of the missile is achieved via the fins 6 or 7 in conventional manner. Two igniters 14a, 14b shown mounted on part of the combustion termination valve 8 within the hollow central passage of the propellant charge 14 are provided to initiate each of two combustion phases for the rocket motor.

In most respects, the rocket motors 4 and 11 are of conventional construction each comprising a pressure vessel 10, 15 in which combustion of a propellant charge takes place to provide the propulsion gases, the configuration and type of propellant charge being appropriately adapted to suit the individual applications in known manner. Rocket motors in accordance with the present invention however are provided with two separate igniters, each of which may again be of conventional type, for enabling the propellant charge system to be ignited twice - once for each propulsion phase.

The construction and operation of the valve 8 of FIGS. 1 and 2 respectively will now be described in greater detail with reference to FIGS. 3 to 8.

Figure 4:
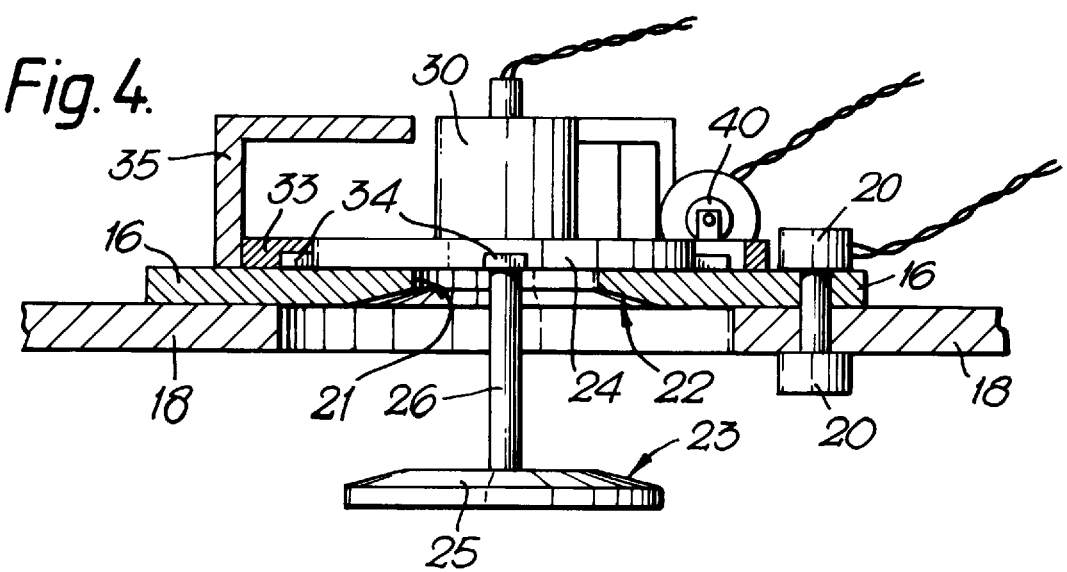
FIG. 4 is a cross-sectional side elevation of the valve along the line IV—IV of FIG. 3.

As seen in FIGS. 3 and 4, the valve comprises an annular plate 16 which surrounds and overlaps the rim of a circular opening 17 in the wall 18 of the pressure vessel of the rocket motor. In the case of the missile configuration shown in FIG. 1, this wall will be the rear end face or closure of the rocket motor pressure vessel, whilst in the FIG. 2 configuration it will be in the forward end face or closure of the rocket motor pressure vessel.

The annular plate 16 is releasably attached to the exterior of the wall 18 of the pressure vessel by means of three equally spaced exploding bolts 20 adapted to be detonated simultaneously on command by an electrical impulse whereby to enable release of the valve from the wall 18 of the rocket motor case.

The valve further comprises primary and secondary sealing plates 24 and 25 respectively, each mounted on a common valve shaft 26. The secondary valve plate 25 is permanently secured to one end of the shaft 26 within the interior of the rocket motor case, i.e. on the high pressure side of the wall 18. The primary valve plate 24 is located outside the rocket motor case being axially spaced from the secondary valve plate 25, along the shaft 26 and coupled to the shaft 26 by means of an explosively operated telescopic ram 30.

The telescopic ram 30 serves to rigidly couple the primary valve plate 24 to the shaft 26 in a first position as shown in FIG. 3, but can be actuated by an electrical command pulse which detonates a small explosive charge to pneumatically drive the primary valve plate 24 along the shaft 26 towards the secondary valve plate 25 and to lock it relative to the shaft in a second position in which the two valve plates 24, 25 abut opposite sides of the rim of the annular plate 16 and thus sandwich it between them as will be described in more detail below.

The inner rim of the aperture 21 in the annular ring 16 is bevelled on its side facing into the rocket motor case to provide a valve seat 22 which is designed to cooperate with the bevelled outwardly facing rim 23 of the secondary valve sealing plate 25 which locates within it in operation.

The primary valve plate 24 is releasably secured to the exterior surface of the annular plate 16 in bayonet fashion by means of four equally spaced lugs 33 depending from the outer surface of plate 16 and which, as shown in FIG. 3, engage behind the outer surface of four correspondingly spaced projections 34 formed on the edge of the primary valve plate 24.

The primary valve plate 24 is releasably retained in the engaged position shown in FIG. 3, in which the lugs 33 engage behind the projections 34 by means of a sheer pin (not shown). Release of the primary valve plate 24 from this position is effected by means of a piston actuator 40 whose body is secured to the annular plate 16, and whose piston rod 42 is tangentially coupled to the primary valve plate 24. The piston actuator 40 is actuable on an electrical command pulse to detonate a small explosive charge which drives the piston rod 42 outwardly thereby rotating the primary valve plate 24 into a position in which the projections 34 are disengaged from behind the lugs 33, thereby releasing the primary valve plate 24 from the annular plate 16.

The annular plate 16 is also formed on its outer surface with a set of three outwardly depending arms 35 evenly spaced around the opening 21 whose free ends project radially inwardly relative to the opening 21 to form a cage for arresting the movement of the primary valve plate 24 upon its release from the annular plate 16.

Conveniently each of the explosively actuated devices, i.e. the exploding bolts 20, the telescopic ram 30 and the piston actuator 40 can be actuated from a common source of electric power which may also provide the ignition impulses for the propellant igniters 9c, 9d; 14a, 14b; all under command from control circuitry located in the missile's guidance head 1.

The operation of the valve in providing two propulsion phases of variable duration from a single propellant charge will now be described in greater detail with reference to FIGS. 5 to 8. The schematic drawings in these figures have been greatly simplified by the removal of unnecessary detail in order to more clearly illustrate the principle of operation.

As shown in FIG. 5, the valve is closed, the primary valve plate 24 being secured in position across the valve opening on the outer, low pressure side of the annular plate 16 by means of the releasable bayonet mechanism 33, 34 described above with reference to FIGS. 3 and 4. In this position, the valve is sealed against the escape of high pressure propulsion gases from the instant of ignition of the rocket motor's propellant charge using initiator 9c; 14b, and subsequent combustion during the first propulsion phase. This propulsion phase is terminated upon command by rapid depressurisation of the rocket motor pressure vessel which is effected by actuation of the explosive piston actuator 40. This causes rotation of the primary valve plate 24 sufficient to release the projections 34 from engagement with the lugs 33.

Under pressure of the propulsion gases in the pressure vessel, the assembly comprising the two valve plates 24 and 25 rigidly coupled to the valve shaft 26 is driven outwardly to the position shown in FIG. 6 in which the valve plate 24 is arrested by the cage formed by the depending arms 35. In this position, the valve is open permitting rapid release, and thus depressurisation, of the propulsion gases within the combustion chamber which in turn causes the propellant charge to be extinguished thereby terminating the first propulsion phase of the rocket motor.

To be effective in rapidly extinguishing the propellant charge the aperture provided by the valve for the escape of combustion gases must be at least 6 to 10 times greater than the aperture of the motor's propulsion nozzle(s) 5, 12.

Re-ignition of the propellant charge by initiation of a second igniter 9d; 14b within the rocket motor pressure vessel to provide a second propulsion phase can only be effected when the valve is closed.

This is achieved by actuation of the telescopic ram 30 by means of an electrical command pulse. The ram 30 drives the primary valve plate 24 along the shaft towards the secondary valve plate 25 causing the two valve plates 24, 25 to reseal the valve by clamping the inner rim of the plate 16 between them with the bevelled edge 23 of the secondary valve plate 25 positively and sealingly engaged in the valve seat 22 formed in the annular plate 16 as shown in FIG. 7. The primary valve plate 24 is rigidly locked to the shaft 26 in this position by the telescopic ram 30, whereupon the second propulsion phase can be initiated by re-ignition of the propellant charge using the second igniter as described above.

When it is subsequently desired to terminate the second propulsion phase on command (in many applications this will be unnecessary) the rocket motor pressure vessel is again depressurised to extinguish the propellant charge by actuation of the exploding bolts 20 which secure the valve to the wall 18 of the rocket motor pressure vessel thereby causing the valve to be expelled from the opening by the high pressure propulsion gases which then escape.

Figure 9:
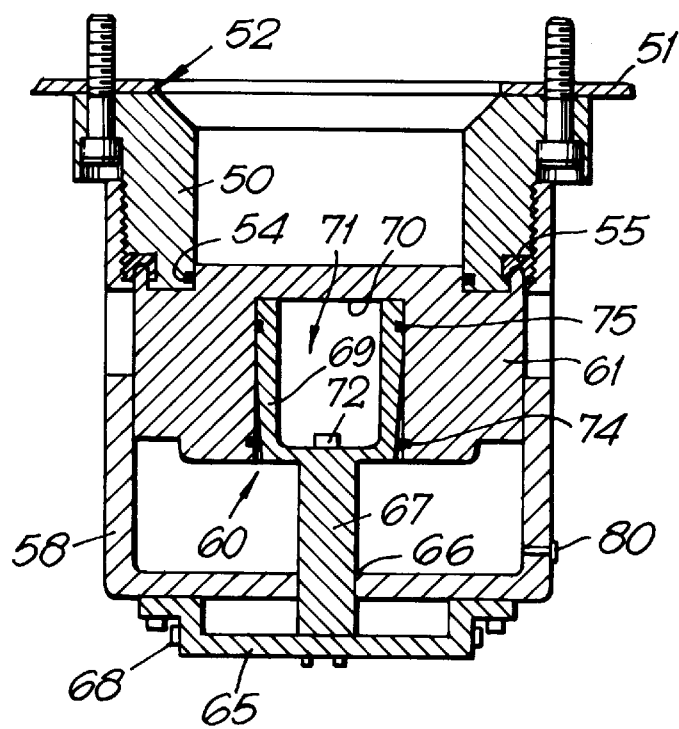
FIGS. 9 to 11 show in cross sectional elevation various stages in the operation of a modified form at that termination value for a rocket motor in accordance with the present invention.
Figure 10:
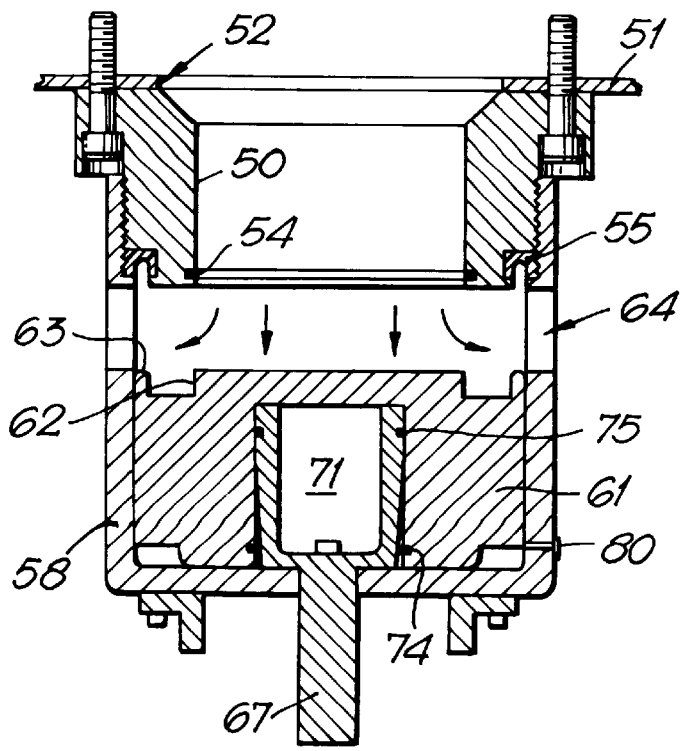
Figure 11:
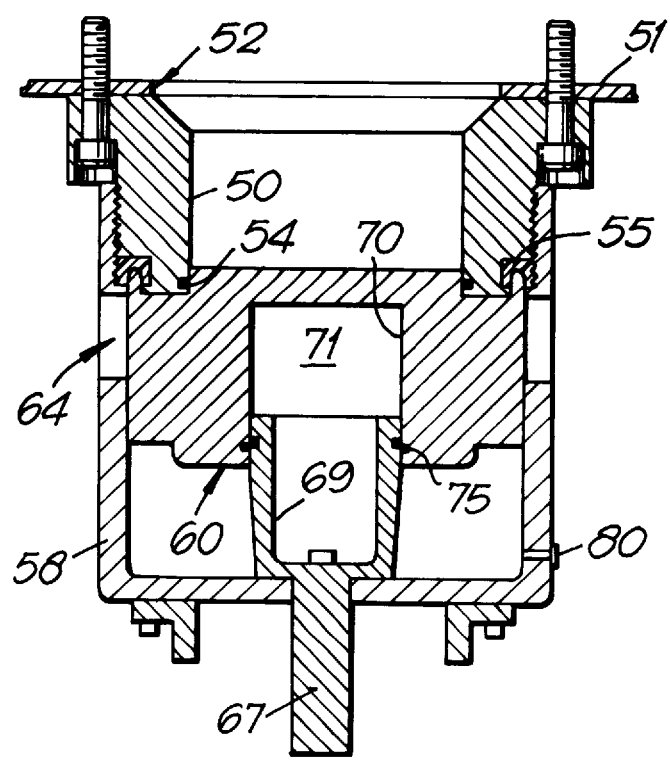

FIGS. 9 to 11 show various stages in the operation of a further embodiment of the invention in which the combustion termination valve comprises a generally annular valve body 50 bolted to the wall 51 of the pressure vessel of the rocket motor around a circular opening 52 therein. The rim of the annular valve body 50 remote from the pressure vessel wall is formed with 2 valve seals 54, 55. The first, or primary valve seal 54 is in the form of a silicon rubber "O" ring seated in an annular radially inwardly directed recess, and the second or secondary valve seal 55 comprises an annular silicon rubber "U" ring seated deep in an axially outwardly directed recess so as to reduce exposure to exhaust combustion gases.

Substantially enclosing and rigidly mounted on the valve body 50 is a cup-shaped valve housing 58 in which is housed a valve member 60 movable axially within the housing 58 in the manner of a piston.

The valve member 60 comprises a generally cylindrical valve piston 61 formed with respective inner and outer sealing surfaces 62, 63 which are adapted to sealingly engage the primary and secondary valve seals 54 and 55 respectively in the valve body 50 when in the closed position as shown in FIG. 9. In this position, the valve piston 61 serves to seal the opening 52 and prevent the escape of combustion gases through side venting ports 64 formed in the wall of the valve housing 58.

The valve member 60 is held in this closed position by means of a top-hat shaped closure plate 65 bolted across an aperture in the roof of the valve housing 58 through which one end of a rod 67 protrudes into abutting relationship with the closure plate 65. The closure plate 65 is provided with an explosive linear cutting charge 68 (eg that sold under the name "BLADE" which is a registered trademark of Royal Ordnance plc) which, when detonated, serves to sever the top of the closure plate 65 thereby releasing the rod 67 and allowing the chamber pressure within the pressure vessel to drive the valve member 60 into the open position shown in FIG. 10.

The other end of the rod 67 is formed with a cup-shaped piston 69 which is slideable within a cylindrical recess 70 in the valve piston 61, the cup-shaped piston 69 and the recess 70 forming between them expansion chamber 71 containing a small pyrotechnic charge 72.

The inner rim of the open end of the recess 70 is provided with a spring loaded lock ring 74. This is adapted to engage within a corresponding groove 75 formed in the outer surface of the free end of the cup-shaped cylinder 69 upon actuation of the pyrotechnic charge 72 to pressurise the expansion chamber 71 causing the piston 69 and the valve piston 61 to move apart to the position shown in FIG. 11. In this connection, the outer surface of the cup-shaped cylinder 69 is tapered to facilitate this operation.

The operation of the thrust termination valve described above with reference to FIGS. 9 to 11 in providing two propulsion phases from a single propellant charge will now be described. As shown in FIG. 9, the valve is initially closed with the inner and outer sealing surfaces 62, 63 of the valve piston 61 held in sealing engagement with the primary and secondary valve seals 54 and 55 by the action of the closure plate 65 on the rod 67 and piston 69. In this condition, the valve serves to close the aperture 52 in the wall 51 of the rocket motor pressure vessel permitting the first propulsion phase to take place upon ignition of the propellant charge.

During this phase, the primary or inner seal 54, 62 serves to protect the secondary or outer seal 55, 63 from exposure to hot combustion gases within the pressure vessel of the rocket motor.

This first propulsion phase may then be terminated upon command by detonation of the linear explosive cutting charge 68 on the top-hat closure plate 65. This serves to sever the top of the plate 65 thereby releasing the rod 67. As a result, the entire valve member 60, comprising the valve piston 61, the rod 67 and the cup-shaped piston 69, are forced under the pressure of combustion gases within the rocket motor pressure vessel 51 to move from the closed position of FIG. 9 to the open position of FIG. 10. Movement of the valve member 60 into this position is damped by a pressure relief needle valve 80 in the wall of the valve housing 58.

In this position, the valve piston 61 abuts the roof of the housing 58, and thereby opens the side venting ports 64 for the exhaustion of the combustion gases within the rocket motor pressure vessel causing rapid depressurisation thereof. This thereby terminates the fist combustion phase.

In order to initiate the second combustion phase, it is necessary to re-seal the opening 52 before re-ignition of the propellant charge. This is achieved by igniting the pyrotechnic charge 72 which causes rapid pressurisation of the expansion chamber 71 forcing the valve piston 61 to telescopically move away from the cup-shaped piston 69 until the locking ring 74 in the rim of the recess 70 engages within the groove 75 in the free end of the piston 69. This firmly locks the two members relative to one another in the position shown in FIG. 11.

In this position the valve is once again closed by engagement of the primary and secondary seals sealing surfaces 62, 63 of the valve piston 61 with the respective inner and outer valve seals 54, 55 of the valve body 50. The secondary seal ensures a complete seal in the likely event that elements of the primary or inner seal 54, 62 are destroyed by escaping hot combustion gases during or upon termination of the first propulsion phase.

If it is desired subsequently to terminate the second combustion phase before the propellant charge has burnt out, the entire valve may be jettisoned as in the embodiment described with reference to FIGS. 3 to 8, by the use of exploding bolts to secure the valve body 50 to the pressure vessel wall.

We claim:

1. A solid propellant combustion apparatus comprising:
    a pressure vessel,
    a solid propellant charge within the pressure vessel for generating combustion gases, and
    a combustion termination valve located in an opening between the interior and exterior of the pressure vessel, the valve, operable on command, comprising a means for terminating a first combustion phase of the propellant charge by causing rapid depressurisation of the interior of the pressure vessel through the release of combustion gases through said opening, and on further command, for resealing said opening prior to re-ignition of the propellant charge to provide a second combustion phase.

2. A solid propellant combustion apparatus as claimed in claim 1, wherein the combustion termination valve is also operable on command to cause rapid depressurisation of the interior of the pressure vessel during the second combustion phase.

3. A solid propellant combustion apparatus as claimed in claim 1, wherein the combustion termination valve is releasably retained in said opening by release means which are operable on command to release the valve from said opening to thereby cause rapid depressurisation of the interior of the pressure vessel to terminate the second combustion phase.

4. A solid propellant combustion apparatus comprising: a pressure vessel, a solid propellant charge within the pressure vessel for generating combustion gases, and a combustion termination valve located in an opening between the interior and exterior of the pressure vessel, the valve being operable on command to terminate a first combustion phase of the propellant charge by causing rapid depressurisation of the interior of the pressure vessel through the release of combustion gases through said opening, and operable on further command to reseal said opening prior to re-ignition of the propellant charge to provide a second combustion phase, wherein the combustion termination valve comprises a valve body surrounding said opening, and first and second valve members located on the low pressure side and the high pressure side of said opening respectively, the valve including means for releasably retaining said first valve member in sealing engagement with the valve body whereby to hold the valve closed from the low pressure side thereof during the first combustion phase, valve opening means operable on command for releasing said retaining means whereby to cause the first valve member to disengage from the valve body thereby opening the valve to terminate said first combustion phase by rapid de-pressurization of the combustion gases through said opening, and valve closing means operable on subsequent command to cause the second valve member to sealingly engage the valve body from the high pressure side whereby to close the valve and prior to re-ignition of the propellant charge for the second combustion phase.

5. A solid propellant combustion apparatus as claimed in claim 4, wherein said valve closing means operates by causing the first and second valve members simultaneously to engage the valve body on opposite sides thereof.

6. A solid propellant combustion apparatus comprising: a pressure vessel, a solid propellant charge within the pressure vessel for generating combustion gases, and a combustion termination valve located in an opening between the interior and exterior of the pressure vessel, the valve being operable on command to terminate a first combustion phase of the propellant charge by causing rapid depressurisation of the interior of the pressure vessel through the release of combustion gases through said opening, and operable on further command to reseal said opening prior to re-ignition of the propellant charge to provide a second combustion phase, wherein the combustion termination valve comprises a valve body surrounding said opening, a valve member, retaining means for releasably retaining said valve member in sealing engagement with the valve body whereby to hold the valve closed during the first combustion phase, and valve opening means operable on command for releasing said retaining means whereby to permit the valve member to disengage from the valve body thereby opening the valve to allow rapid depressurisation of the interior of the pressure vessel through said opening, and valve closing means operable on subsequent command to cause the valve member to sealingly engage the valve body whereby to close the valve prior to re-ignition of the propellant charge for the second combustion phase.

7. A solid propellant combustion apparatus as claimed in claim 6, including latch means for locking the valve body in the closed position during the second combustion phase.

8. A solid propellant combustion apparatus as claimed in claim 6 wherein the valve includes primary and secondary sealing means providing the seal between the valve body and the valve member, the primary sealing means serving to isolate and protect the secondary sealing means from damage from combustion gases generated during the first combustion phase.

9. A solid propellant combustion apparatus as claimed in claim 6 wherein the valve closure means comprises piston and cylinder means actuable to force the valve member into the closed position.

10. A solid propellant combustion apparatus as claimed in claim 6 including means for damping movement of the valve member into its open position upon release of the retaining means.

* * * * *